United States Patent [19]

Jabsen

[11]  4,213,824
[45]  Jul. 22, 1980

[54] NUCLEAR STEAM SYSTEM CONTAINMENT

[75] Inventor: Felix S. Jabsen, Lynchburg, Va.

[73] Assignee: The Babcock & Wilcox Company, New Orleans, La.

[21] Appl. No.: 809,220

[22] Filed: Jun. 23, 1977

[51] Int. Cl.² ............................................. G21C 15/18
[52] U.S. Cl. .......................................... 176/38; 176/87
[58] Field of Search ............................... 176/37, 38, 87

[56] References Cited

U.S. PATENT DOCUMENTS

| 3,115,450 | 12/1963 | Schanz | 176/87 |
| 3,275,523 | 9/1966 | Campbell et al. | 176/87 |
| 3,454,466 | 7/1969 | Pitt et al. | 176/38 |
| 3,718,539 | 2/1973 | West et al. | 176/38 |
| 3,888,734 | 6/1975 | Joric | 176/50 |

FOREIGN PATENT DOCUMENTS

| 1564289 | 5/1970 | Fed. Rep. of Germany | 176/38 |
| 2212761 | 3/1973 | Fed. Rep. of Germany | 176/38 |
| 2616831 | 4/1976 | Fed. Rep. of Germany | 176/38 |
| 1303680 | 8/1961 | France | 176/38 |
| 1100625 | 1/1968 | United Kingdom | 176/38 |

OTHER PUBLICATIONS

"New Reactor Promises Competitive Power", C & E News, Jul. 10, 1961, pp.21 and 22.

Primary Examiner—Samuel W. Engle
Assistant Examiner—S. A. Cangialosi
Attorney, Agent, or Firm—Robert J. Edwards; Robert H. Kelly

[57] ABSTRACT

An improved containment for radiation shielding and pressure suppression is presented. The arrangement, which is particularly suited for marine propulsion application, includes, in a preferred embodiment, a double wall containment shell including water as a biological shield, a divided wet well arrangement and means for precluding discontinuity of the radiation shielding effect due to shifting of the liquid in the wet well at various ship attitudes.

38 Claims, 2 Drawing Figures

NUCLEAR STEAM SYSTEM CONTAINMENT

This invention was made in the course of work under Contract No. 4-37067 between the Babcock and Wilcox Co. and the U.S. Department of Commerce. The Government is licensed under and, on the occurence of a condition precedent set out in the contract, shall acquire title to this application and any resulting patent.

BACKGROUND OF THE INVENTION

1. Field of the Invention

The present invention relates to a containment and pressure suppression arrangement for a consolidated nuclear steam system.

2. Summary of the Prior Art

A consolidated nuclear steam system (CNSS) incorporates a nuclear core, steam generator and reactor coolant pumps within a single pressure vessel, thereby achieving a compact arrangement and minimizing the use of auxiliary equipment. The CNSS is particularly beneficial in marine propulsion applications where reduced size and weight decrease the capital cost of the power plant and the ship, and increase the available space for cargo and passenger accommodations.

A compact pressure suppression system, similar to those used for stationary nuclear power plants, provides a secondary containment for the CNSS.

The main purpose of the CNSS containment is to confine and control potential releases of radioactivity from the reactor coolant system following a postulated occurence known in the art as a loss of coolant accident (LOCA).

The containment often includes two compartments commonly designated as the dry well and the wet well, the latter so called since it contains a liquid pressure suppression pool. All flow process penetrations into the pressure vessel are made within the dry well compartment.

Thus, the dry well receives the discharge of the reactor coolant in the event a loss of coolant accident (LOCA). Reactor coolant effluent, in the form of steam and water, is discharged into the dry well during a LOCA, mixes with the air therein, and pressurizes this compartment. A set of vent pipes generally directs the effluent from the dry well into the liquid pressure suppression pool of the wet well. The vent pipe discharges are submerged in the wet well water in order to condense the effluent, thereby serving to limit peak pressure and temperature. The water in the pressure suppression pool also functions as a radiation shield.

A number of variations in pressure suppression and containment systems embodying the principles described above are known in the prior art. In some arrangements, the containment shell is a free standing steel cylinder supported at its bottom with a main operating floor approximately half-way up the containment dividing it into two compartments. An annular wet well is formed by the cooperation of a second cylindrical shell that is disposed below the operating floor, located as close to the reactor as feasible, with the containment wall or outer cylindrical shell. The lower portion of the wet well is filled with water and constitutes the vapor suppression pool. The annular wet well is sub-divided into separate chambers by vertical baffle plates which extend upwardly from the bottom of the containment and one vent pipe discharges into each chamber. The chambers are arranged so that the discharge point of the vent pipe remains submerged during ship motion. However, an air space is generally provided above the suppression pool within the wet well in order to allow for the volumetric compression of the air forced into the wet well from the dry well with the reactor effluent during a LOCA. During normal operations, therefore, suppression pool water will shift as a result of the pitch and roll of the ship. Low pressure rupture discs in the vent pipes normally separate the dry and wet well in order to prevent the suppression pool water from flowing into the dry well at extreme ship attitudes.

A major objective in CNSS containment designs for ship propulsion systems is to afford maximum protection from the ionizing radiation emanating from the reactor core with minimum radiation shield weight. The primary shielding includes all the materials of the containment vessel and, as noted above, the annular shield provided by the water of the vapor suppression pool. Hence, shifting of part of the water in the wet well in conjunction with the pitch and roll of the vessel results in a discontinuity of the shielding about the core. In the prior art, the reactor containment has been surrounded by a heavy concrete biological shield designed to limit radiation dose rates in the surrounding ship areas.

SUMMARY OF THE INVENTION

According to the present invention, an improved containment and vapor suppression arrangement for a consolidated nuclear steam supply system is presented.

A novel wet well having baffled chambers formed in its upper portion provides a significantly reduced air volume above the vapor suppression pool in order to minimize the discontinuity of radiation protection afforded by water in the pool during ship motion. Means are provided to accommodate the effects of the reduced air volume above the suppression pool.

The overall containment structure is designed to satisfy biological shielding requirements by the use of water filled double wall and upper head arrangements.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DESCRIPTION OF THE PREFERRED EMBODIMENT

Figure 1:
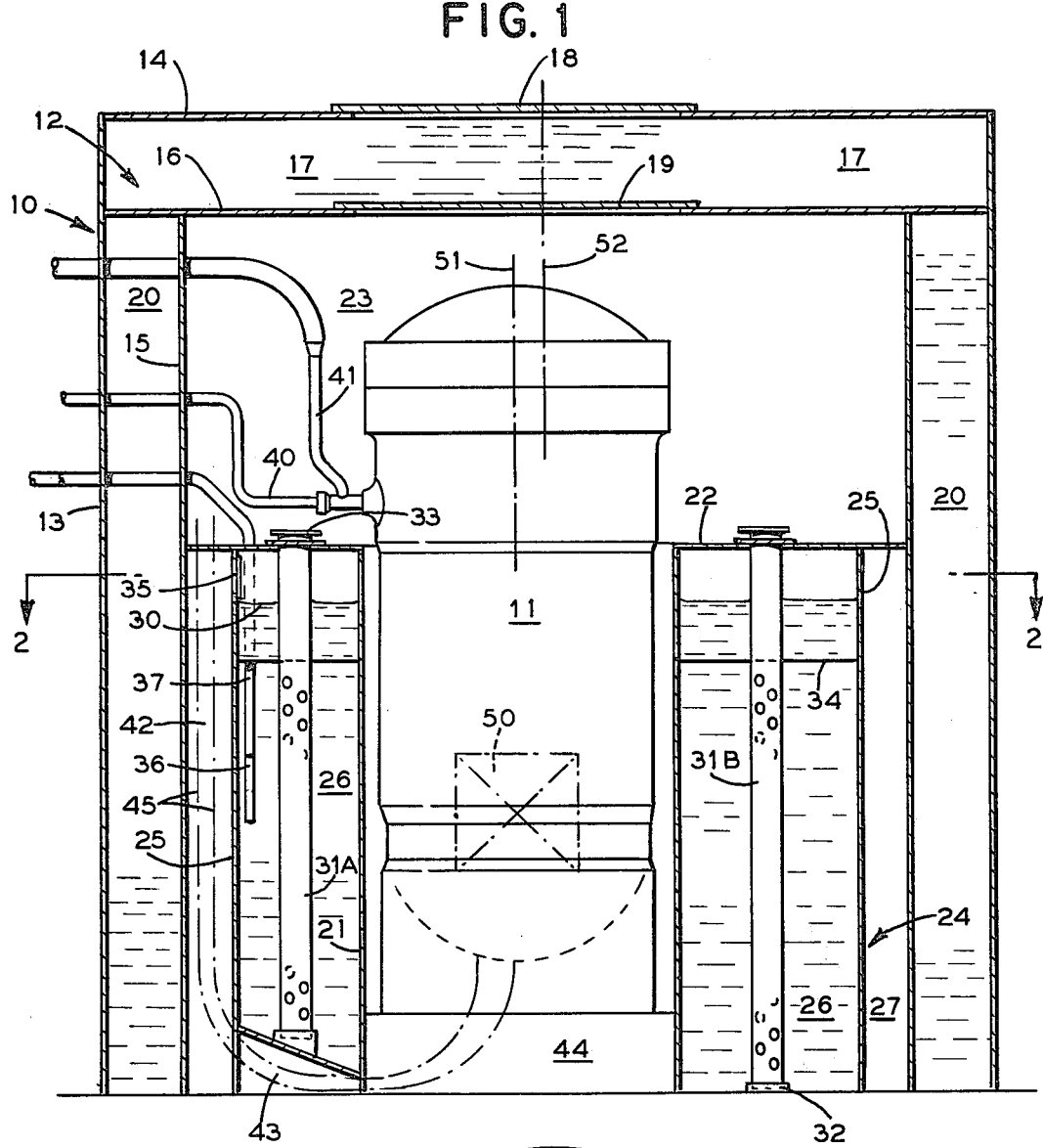
FIG. 1 is a vertical section of a nuclear steam generating plant embodying the present invention, with portions shown schematically, and for the sake of simplicity, considerable detail unrelated to the invention has been omitted
Figure 2:
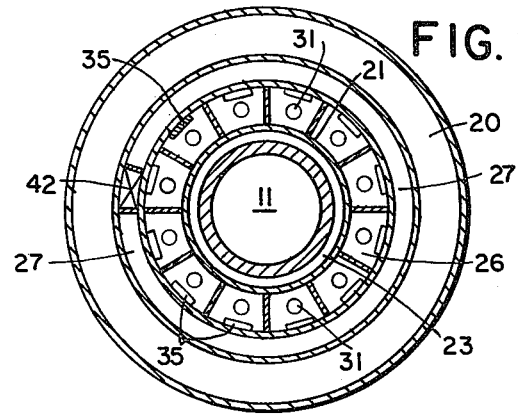
FIG. 2 is a schematic plan view of FIG. 1 taken along lines 1—1.

The sole drawing illustrates a preferred embodiment of a nuclear steam generating plant 10 including a vertically positioned pressure vessel 11 contained within a containment 12 of circular cross section. The pressure vessel 11 forms a pressurized container for a consolidated nuclear steam system (not shown in detail).

The containment 12 consists of an outer cylindrical containment wall 13 topped by an outer upper head 14, and an inner cylindrical containment wall 15 topped by an inner upper head 16. An annular shaped chamber 20 is formed by the boundaries of the outer and inner walls, 13 and 15 respectively, and the inner upper head 16; and, an upper chamber 17 is formed between the upper inner and outer heads, 16 and 14 respectively, and the upper portion of the outer wall 13. The outer upper head 14 and inner upper head 16 are provided with removable sections, 18 and 19, respectively.

A vertically disposed cylindrical shell 21, radially spaced in close proximity about the lower portion of the pressure vessel 11, cooperates with a horizontally disposed floor 22 to divide the containment into two compartments designated as the dry well 23 and wet well 24. A second cylindrical shell 25 is disposed in the wet well 24, radially spaced between the cylindrical shell 21 and the lower portion inner containment wall, thus subdividing the wet well into an inner annular region 26, and an outer annular region 27. Suppression pool water is contained only within the inner annular region 26 to a level 30 located so as to substantially fill the region. In the embodiment shown in the sole drawing, the centerline 51 of the pressure vessel 11 is not coincident with the centerline 52 of the containment 12. Although not essential to the practice of the invention, the centerlines 51, 52 are typically offset in order to facilitate the location of auxiliary equipment (not shown) in the dry well 23. Hence, it should be understood that cylindrical shell 21, in the embodiment illustrated in the drawing, is not concentrically circumscribed by the cylindrical shell 25.

A plurality of vertically disposed perforated pressure suppression pipes 31, only two (31A, 31B) of which are shown for clarity, are substantially located within annular region 26 and extend through the horizontal floor 22 such that their upper extremity extends into the dry well 23.

The lower end of each pressure suppression pipe 31 longitudinally extends partly into a ring collar 32 which is radially spaced thereabout to permit expansion of the pipe while precluding excessive lateral movements. Low pressure rupture discs 33 seal the upper end of the pressure suppression pipes. The upper volume of the inner annular region 26 is divided into circumferential upper portions by baffles 34, extending downward from the floor 22 to a level below that of the liquid level 30. The baffles 34 are circumferentially disposed between the vapor suppression pipes 31. Rupture discs 35 are provided above the water level 30 in the cylindrical shell 25. One rupture disc 35 is generally provided between each pair of circumferentially adjacent baffle plates 34.

Feed 36 and returns 37 cooling pipe connections are provided within the inner annular region 26 and are attached to a cooling system (not shown). The feed 36 and return 37 cooling pipe connections provide means for circulating and cooling the water of the suppression pool which is heated due to convection from the pressure vessel and from the absorption of gamma radiation escaping from the core.

A feedwater inlet pipe 40 and a steam outlet pipe 41 penetrate the outer and inner containment walls, 13 and 15 respectively, pass through the dry well 23, and extend into the pressure vessel 11. While only one inlet and one outlet pipe are illustrated, a plurality of these pipes would generally be disposed at spaced intervals about the pressure vessel and throughout the containment.

A sealed conduit 42 traverses the outer annular region 27 and connects with a fluid tight passage 43 leading to a lower region 44 which is located below the pressure vessel. Instrument lines 45 from outside (not shown) of the containment are routed through the dry well to the lower region and enter the bottom of the reactor via the conduit 42, passages 43 and lower region 44.

In operation, the reactor core 50 which is illustrated schematically, is disposed significantly below the suppression pool water level 30 in the annular region 26 which directly circumscribes the lower portion of the pressure vessel. Chambers 17 and 20 are water filled to afford biological shielding from the ionizing radiation which emanates from the reactor core.

In ship propulsion applications, under normal conditions, the height of the water level 30 precludes significant reduction of the shielding achieved when the vessel achieves extreme attitudes. The baffled arrangement of the upper portion of the suppression pool effectively prevents air located above the water level 30 from shifting to the higher portion of the inner annular region during the pitch and roll of the vessel in which the reactor plant is located.

All process penetrations into the pressure vessel 11 are made in the dry well compartment, thus the dry well 23 initially receives the discharge fluid upon a loss of coolant accident. As the dry well pressurizes the discs 33 rupture allowing the flow of fluid and air through the pressure suppression pipes 31 and into the suppression pool where the condensible gases released from the pressure vessel condense. The inner annular region, in turn, pressurizes causing the discs 35 to burst into the outer annular region, thereby relieving the pressure build up in the inner annular region.

Means (not shown) are provided for draining the upper chamber 17. The center sections 18 and 19 of the upper outer head 14 and inner head 16 are removable for servicing, installation and removal of major components, and refueling of the reactor.

The use of the water filled double wall containment arrangement permits elimination or a substantial reduction in the thickness of the biological shield of concrete (not shown) traditionally used resulting in an overall reduction in containment weight. The division of wet well and utilization of the waterless outer annular region 27 results in an increased suppression pool height which, in itself, and in conjunction with the inner region baffles 34 enhances the additional radiation shielding provided by the suppression pool.

It will be evident to those skilled in the art that changes may be made, e.g. the use of sand for biological shielding purposes in chamber 20, or that parts of the invention may be used without other parts described herein, without departing from the spirit of the invention covered in the claims.

The embodiments of the invention in which an exclusive property or privilege is claimed are defined as follows:

1. An improved containment used for radiation shielding and pressure suppression comprising a dry well including a pressure vessel, a plurality of cocentric wall means, said plurality of cocentric wall means defining at least three annular regions about said dry well, a first annular region providing the containment used for radiation shielding, a second annular region which is substantially dry, a third annular region providing a wet well for relieving fluid pressure released from the pressure vessel into the dry well, and pipe connection means extending into the wet well from the dry well, a pool of liquid disposed to partially fill said third annular region, the upper and portion of the second and third annular regions having an enclosure, and a plurality of baffle plates extending vertically downward from said enclosure in said third annular region into said pool of liquid so as to circumferentially divide the upper portion of said third annular region into a plurality of circumferential upper portions.

2. An improved containment as set forth in claim 1 wherein the containment further comprises an outer cylindrical wall terminated by an outer head, an inner cylindrical wall terminated by an inner head, said outer cylindrical wall being radially spaced from said inner cylindrical wall so as to form an annular shaped chamber therebetween, said inner head being spaced from said outer head so as to form a head chamber therebetween, and a biological shield material disposed within said annular shaped chamber and said head chamber.

3. An improved containment as set forth in claim 2 wherein said biological shield material is water.

4. An improved containment as set forth in claim 2 wherein at least one pipe connection means vertically extends through one of said circumferential upper portions into said pool of liquid.

5. An improved containment as set forth in claim 4 wherein said pipe connection means further comprises a perforated pipe.

6. An improved containment as set forth in claim 5 further comprising at least one ring collar, each of said pipe connection means longitudinally extending in part into one of said ring collars which is radially spaced thereabout to permit longitudinal expansion while precluding excessive lateral movement of said pipe connection means.

7. An improved containment as set forth in claim 6 further comprising at least one rupture disc, wherein the end of the perforated pipe communicating with the dry well is sealed by said rupture disc.

8. An improved containment as set forth in claim 2 further comprising a plurality of rupture discs, at least one of said rupture discs being disposed within said wall means for dividing the wet well at a location within each of said circumferential upper portions.

9. An improved containment as set forth in claim 2 further comprising instrument means, a conduit, a fluid tight passage, a lower region below said pressure vessel, said conduit traversing said outer annular region, said fluid tight passage disposed to pass through said inner annular region and communicating with said conduit and said lower region such that said instrument means may be routed from the dry well, through said conduit and said fluid tight passage to said lower region.

10. An improved containment as set forth in claim 1 wherein the pressure vessel encloses a consolidated nuclear steam system.

11. An improved containment used for radiation shielding and pressure suppression in marine propulsion applications comprising a dry well including a pressure vessel, a plurality of cocentric wall means, said plurality of cocentric wall means defining at least three annular regions about said dry well, a first annular region providing the containment used for radiation shielding, a second annular region which is substantially dry, a third annular region providing a wet well for relieving fluid pressure released from the pressure vessel into the dry well, and pipe connection means extending into the wet well from the dry well, a pool of liquid disposed to partially fill the third annular region, the upper and portion of the second and third annular regions having an enclosure, and a plurality of baffle plates extending vertically downward from said enclosure in said third annular region into the pool of liquid so as to circumferentially divide the upper portion of the third annular region into a plurality of circumferential upper portions.

12. An improved containment as set forth in claim 11 wherein the containment further comprises an outer cylindrical wall terminated by an outer head, an inner cylindrical wall terminated by an inner head, said outer cylindrical wall being radially spaced from said inner cylindrical wall so as to form an annular shaped chamber therebetween, said inner head being spaced from said outer head so as to form a head chamber therebetween, and a biological shield material disposed within said annular shaped chamber and said head chamber.

13. An improved containment used for radiation shielding and pressure suppression comprising a dry well including a pressure vessel, a plurality of cocentric wall means, said plurality of cocentric wall means defining at least three annular regions about said dry well, a first annular region providing the containment used for radiation shielding, a second annular region which is substantially dry, a third annular region providing a wet well for relieving fluid pressure released from the pressure vessel into the dry well, and pipe connection means extending into the wet well from the dry well, a pool of liquid disposed to partially fill the third region, the upper and portion of the second and third annular regions having an enclosure, and a plurality of baffle plates extending vertically downward from said enclosure in said third region into the pool of liquid so as to divide the upper portion of the third region into a plurality of spaced upper portions.

14. An improved containment as set forth in claim 13 wherein the containment further comprises spaced upper portions, an outer wall terminated by an outer head, an inner wall terminated by an inner head, the outer wall being radially spaced from the inner wall so as to form a shaped chamber therebetween, the inner head being spaced from said outer head so as to form a head chamber therebetween and a biological shield material disposed within the shaped chamber and the head chamber.

15. An improved containment as set forth in claim 13 wherein at least one pipe connection means vertically extends through one of the spaced upper portions into the pool of liquid.

16. An improved containment as set forth in claim 15 wherein the pipe connection means further comprises a perforated pipe.

17. An improved containment as set forth in claim 16 further comprising at least one ring collar; each of said pipe connection means longitudinally extending in part into one of the ring collars which is radially spaced thereabout to permit longitudinal expansion while precluding excessive lateral movement of the pipe connection means.

18. An improved containment as set forth in claim 17 further comprising at least one rupture disc, wherein the end of the perforated pipe communicating with the dry well is sealed by the rupture disc.

19. An improved containment as set forth in claim 13 further comprising a plurality of rupture discs at least one of the rupture discs being disposed within the wall means for dividing the wet well at a location within each of the spaced upper portions.

20. An improved containment as set forth in claim 14 wherein at least one pipe connection means vertically extends through one of the spaced upper portions into the pool of liquid.

21. An improved containment as set forth in claim 20 wherein the pipe connection means further comprises a perforated pipe.

22. An improved containment as set forth in claim 21 further comprising at least one ring collar; each of said pipe connection means longitudinally extending in part into one of the ring collars which is radially spaced thereabout to permit longitudinal expansion while precluding excessive lateral movement of the pipe connection means.

23. An improved containment as set forth in claim 22 further comprising at least one rupture disc, wherein the end of the perforated pipe communicating with the dry well is sealed by the rupture disc.

24. An improved containment as set forth in claim 1 wherein at least one pipe connection means vertically extends through one of said circumferential upper portions into said pool of liquid.

25. An improved containment as set forth in claim 24 wherein said pipe connection means further comprises a perforated pipe.

26. An improved containment as set forth in claim 25 further comprising at least one ring collar, each of said pipe connection means longitudinally extending in part into one of said ring collars which is radially spaced thereabout to permit longitudinal expansion while precluding excessive lateral movement of said pipe connection means.

27. An improved containment as set forth in claim 11 wherein at least one pipe connection means vertically extends through one of said circumferential upper portions into said pool of liquid.

28. An improved containment as set forth in claim 27 wherein said pipe connection means further comprises a perforated pipe.

29. An improved containment as set forth in claim 28 further comprising at least one ring collar, each of said pipe connection means longitudinally extending in part into one of said ring collars which is radially spaced thereabout to permit longitudinal expansion while precluding excessive lateral movement of said pipe connection means.

30. An improved containment as set forth in claim 29 further comprising at least one rupture disc, wherein the end of the perforated pipe communicating with the dry well is sealed by said rupture disc.

31. An improved containment as set forth in claim 12 wherein at least one pipe connection means vertically extends through one of said circumferential upper portions into said pool of liquid.

32. An improved containment as set forth in claim 31 wherein said pipe connection means further comprises a perforated pipe.

33. An improved containment as set forth in claim 32 further comprising at least one ring collar, each of said pipe connection means longitudinally extending in part into one of said ring collars which is radially spaced thereabout to permit longitudinal expansion while precluding excessive lateral movement of said pipe connection means.

34. An improved containment as set forth in claim 33 further comprising at least one rupture disc, wherein the end of the perforated pipe communicating with the dry well is sealed by said rupture disc.

35. An improved containment as set forth in claim 1 further comprising a plurality of rupture discs, at least one of said rupture discs being disposed within said wall means for dividing the wet well at a location within each of said circumferential upper portions.

36. An improved containment as set forth in claim 26 further comprising at least one rupture disc, wherein the end of the perforated pipe communicating with the dry well is sealed by said rupture disc.

37. An improved containment as set forth in claim 11 further comprising a plurality of rupture discs, at least one of said rupture discs being disposed within said wall means for dividing the wet well at a location within each of said circumferential upper portions.

38. An improved containment as set forth in claim 12 further comprising a plurality of rupture discs, at least one of said rupture discs being disposed within said wall means for dividing the wet well at a location within each of said circumferential upper portions.

* * * * *